United States Patent Office 3,271,673
Patented Sept. 6, 1966

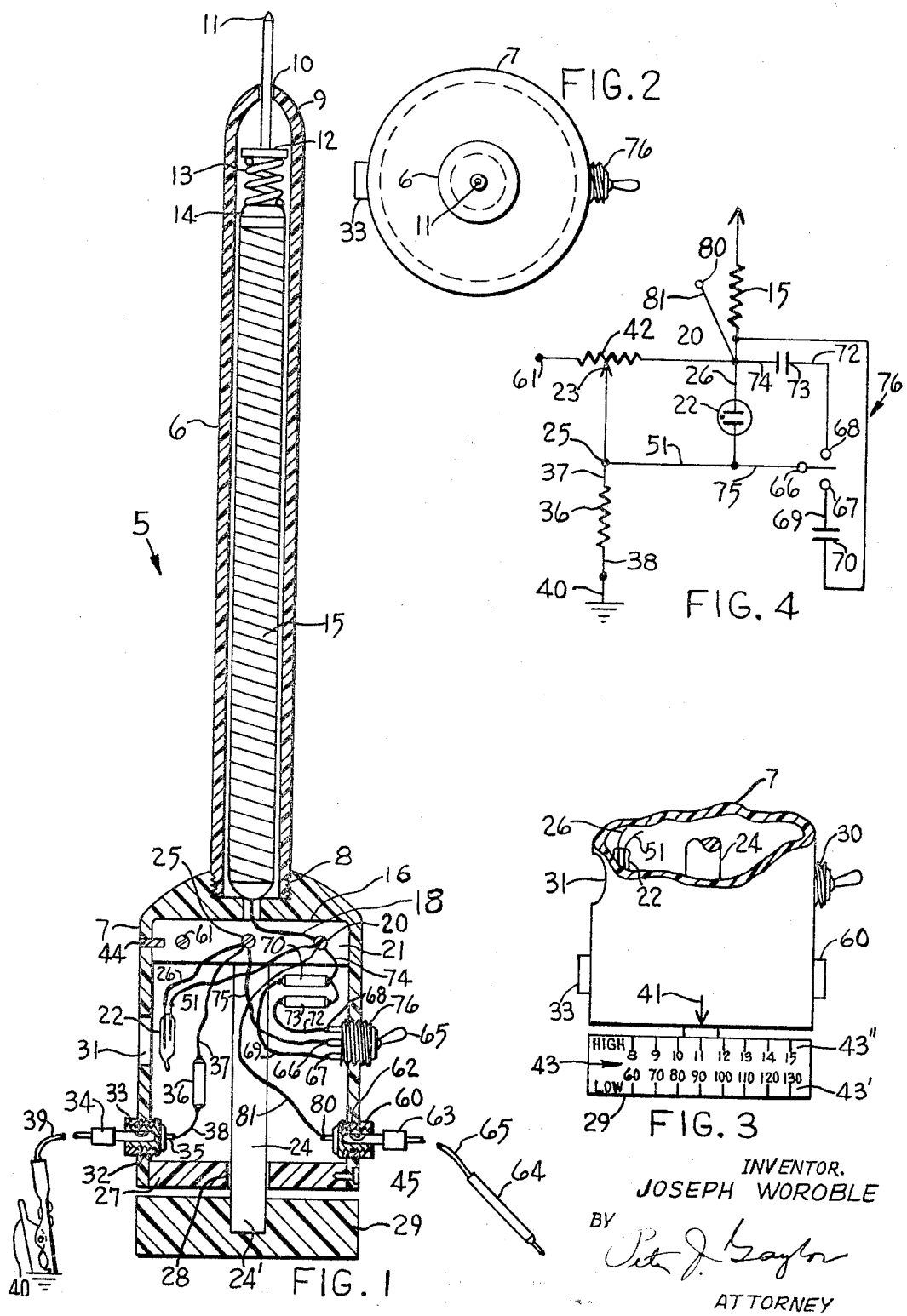

3,271,673
HIGH VOLTAGE TELEVISION TEST PROBE HAVING AN ADJUSTABLE FREQUENCY BLINKER INDICATOR
Joseph Woroble, Kearny, N.J.
(55 Morgan Place, North Arlington, N.J. 07032)
Filed Jan. 12, 1966, Ser. No. 520,281
4 Claims. (Cl. 324—72.5)

This application is a continuation-in-part of copending application Serial No. 209,135, filed on July 11, 1962, by Joseph Woroble, and now abandoned.

This invention deals with a long, insulated probe for testing of kilovolt conditions in television sets, X-ray machines, and the like. More specifically, it relates to a long, narrow, insulated test probe incorporating a self-contained testing instrument having a high megohm fixed resistance connected to a variable resistance and neon lamp, and provided with a window for viewing the lamp as the high tension D.C. voltage is being tested. Provision is also made for testing of low and high voltages separately, and one or more capacitors are present to provide for the blinking of the neon lamp when the correct voltage is reached.

In the testing of the picture tube and other high voltage circuits of television sets, various instruments have been proposed. The one in most common use at present is an expensive and large D.C. voltmeter connected to a special separate probing contact. When making outside calls on television repair, space-saving in the tool kit is of prime importance, and such testing units do not fit this requirement. Other units proposed for such use also include relatively bulky mounted meters with flexible insulated leads which are to be applied by the hands to the inside circuit parts to be tested, a dangerous procedure when the set is turned on.

The high voltage developed in television sets can run from about 8000 volts in 10" picture tube sets, to about 14,000–18,000 volts for 21" black-and-white picture tubes, and as high as 20,000 to 28,000 volts for color sets. Obviously, voltage in this kilovolt range is particularly dangerous, and extreme caution must be taken by the operator when testing a set while it is turned on.

The picture tube anode voltage is generated by the "fly-back" transformer in the horizontal output circuit. This voltage is generated by short microsecond pulses at a frequency of 15,750 cycles per second, and is therefore a miniature transmitter, radiating power in the surrounding area. Insertion of electrical components in this electrical field will not only necessarily result in inaccurate readings, but will also light neon lamps, for example, which are inserted in the field, regardless of the D.C. voltage to be tested.

According to the present invention, the housing of the probe has an enlarged upper portion in which all of the important electrical elements, including the neon lamp, are located, so that they are disposed at a respectful distance from the developed D.C. field. The present invention is a single instrument probe which can make possible the measurement of high voltage in an effective, inexpensive, and safe manner, and without the need of bringing expensive, bulky, and heavy voltmeters for the purpose.

The invention will be more readily understood by reference to the accompanying drawing in which a structure constituting a preferred embodiment is illustrated, and in which the same numerals refer to similar parts. In this drawing, which forms part of this specification:

FIGURE 1 depicts a cross-sectional side view of a probe of the present invention;

FIGURE 2 presents a contact-end view of the same unit with the jacks and leads removed;

FIGURE 3 illustrates a side view of the voltage-reading end portion of the same device, showing the window; and FIGURE 4 shows the electrical circuit employed in the unit.

Referring again to the drawing numeral 5 represents, generally, the probe of the present invention. It consists of a long, narrow insulating tube portion 6, made of insulating plastic, such as polystyrene, polypropylene, phenol-formaldehyde resin, or the like, and preferably transparent, and is attached to the end of the wider housing portion 7, by means of threads 8. The high voltage or contact end 9 of tube 6 is narrowed down or tapered to a small end opening 10 through which projects pointed metal probe contact 11. The inner end of contact rod 11 is attached to a flat metal head 12 serving as a stop for contact rod 11, and also serving as a thrust base for metal coiled spring 13, which is in bare contact with terminal end 14 of resistor cartridge 15. Fixed resistor lead 18 is attached to terminal or connection 20 of variable resistor 21 which, for example, has a 5 megohm to 10 megohm spread. Also connected to terminal 20, is lead 51 of neon lamp 22. The inner variable resistance moving contact 23 of resistor 21 is rotated by shaft 24, and is connected to outside terminal or connection 25. The other lead 26 of neon lamp 22 also is connected to this terminal 25.

The bottom wall 27 of housing portion 7 is provided with a centrally-disposed opening 28 through which projects shaft 24. A knob 29 is provided on projecting end 24' of shaft 24, and it is affixed thereto by cement, or the like. A window 31 is cut through the wall of housing 7 to enable the operator to see whether neon lamp 22 is on or off. Hole 32 is made in the wall of housing portion 7 to accommodate plug receptacle 33 for jack 34, the latter being capable of being plugged into contact with electrical terminal 35 of receptacle 33. A fixed resistor fuse 36 of, for example, one megohm value, is connected by lead 38 to jack terminal 35, and by lead 37 to variable resistor terminal 25. Insulated lead 39, attached to jack 34, terminates with alligator clip 40, which is attached to the ground. An index 41 is provided on the bottom of housing 7 to indicate the extent of variable resistance 42 provided in resistor 21 when knob 29 is turned, the periphery of which latter knob is calibrated in kilovolts, provided on scale 43".

Provision is also made in the probe of the present invention to measure lower voltages, by eliminating the use of fixed resistor 36. In this case, a jack housing 60 is mounted in hole 62 of housing portion 7, so as to accommodate jack 63 connected to auxiliary probe 64 by line 65. Jack 63 makes contact with inner terminal 80 of jack housing 60, and terminal 80 is connected, by line 81, to terminal 20. Thus, by using probe 64 and ground 40, and not using probe 11 and the high resistance cartridge 15, it is possible to measure low voltages, which could be read from the low voltage scale 43' on knob 29.

Provision also is made in this invention for causing the neon lamp to blink, so as to give a clearer indication when the correct voltage is reached upon turning of the knob 29. A toggle switch 76 is mounted in the wall of housing portion 7, so that, upon actuation of toggle 65, it is possible to connect center inner switch contact 66 with either inner switch terminals 67 or 68. Terminal 67 is connected by line 69 to capacitor 70, which would blink in a voltage range say in the 10,000–20,000 volt range. The other terminal of capacitor 70 is connected by line 71 to contact 20.

Terminal 68 is connected by line 72 to capacitor 73, which would blink in the voltage range of, say, for example, 20,000 to 30,000 volts. The other terminal of capacitor 73 is also connected, by line 74, to fixed terminal 20 of variable resistor 21. The center terminal 66 is connected by line 75 to terminal 25.

The unit is assembled by first threading lead 18 of cartridge 15 through opening 17 of retaining wall 16 and connecting it to variable resistor terminal 20. Already connected to the variable resistor, are lamp 22, and resistor fuse 36, the latter also being connected to jack receptacle connection 35. Also, jack terminal 66 is already connected to open end terminal 61 of the variable resistor, and the capacitors 70 and 73 have been installed according to the aforesaid directions. Then probe rod 11 is dropped into tube 6, and spring 13 and cartridge 15 are also inserted therein, and tube 6 is screwed onto housing portion 7. Thereafter, variable resistor shaft 24' is pushed against retainer wall 16 and locked in place by set screw 44. Lamp 22 is adjusted so that it is visible in window 31, and bottom wall 27 is fastened to housing 7 by set screw 45. Knob 29 may be fastened to shaft 24' by set screw 30. Then jack 34 is inserted in receptacle 33, and the unit is ready for testing high voltages.

When the unit of the present invention is used for testing the high voltage circuit of a television set, clamp 40 is attached to a convenient ground, and probe 5 is inserted into the set so that pointed contact 11 may be touched at the points to be tested. Spring 13 provides the resiliency to the contact 11 so as to avoid any possible damaging mechanical shock to sensitive parts. When a neon lamp of ¼ watt or lower is employed, it will light when approximately 65 volts are applied to its terminals. Thus, when probe contact 11 is applied to the high voltage point to be tested, and toggle 65 is snapped for the voltage range expected, knob 29 is turned from the lowest point on scale 43 until lamp 22 begins to blink. This means that variable resistance 42 has reached a point where the voltage drop across it is about 65 volts. At first the blinking will be slow, then faster as the knob 29 is turned, and, after the correct voltage reading is passed, the lamp 22 will light continuously. Blinking of the lamp at about 2–4 per second gives the correct voltage which is then read on the proper scale 43".

In the case of low voltages of, say 65 to 500 volts, probe 64 may be used instead of probe 11, and the low voltage scale 43' is used for reading the proper voltage.

It will be noted that the use of the compact probe of the present invention gives a rapid reading of both high and low voltages at minimum cost and with minimum equipment as well as with safety to the operator. If a higher voltage is to be read, as in X-ray machines, and the like, it is merely necessary to replace the resistance cartridge 15 with the required added resistance cartridge, and to replace knob 29, or the scale thereon, to provide the proper reading.

From the foregoing description of the device and its operation, it will be apparent that there may be various changes in detail of construction without departing from the spirit of the invention, and, therefore, the invention is claimed broadly as indicated by the appended claims. Having thus described the invention, what is claimed new and useful and desired to be secured by United States Letters Patent is:

1. A television high voltage testing probe, comprising, in combination,
   a narrow elongated insulating tube tapered at one end and terminating with a small opening,
   an enlarged hollow insulating housing connected to the other end of said tube and having a window and an index near its open end,
   a conductive pointed contact rod disposed within the end of said tube and projecting through the small opening thereof,
   a multi-megohm fixed resistance cartridge having an end lead and disposed within said tube and connected at its other end in conducting relation with said rod,
   an insulating retainer wall disposed in said enlarged housing adjacent said cartridge end lead and having access therethrough for said cartridge lead,
   a variable resistor having a fixed connection, an open end connection, and a variable resistance connection, and a rotatable resistance-varying shaft projecting axially out of said housing and mounted in said housing behind said retainer wall and connected to said cartridge lead at its fixed connection,
   a jack receptacle mounted in the wall of said housing and having an internal jack connection,
   a fixed fuse resistor connected in series with said jack connection and the variable resistance connection of the variable resistor,
   a knob attached to the projecting shaft end of said variable resistor and calibrated to indicate, in conjunction with the index on the housing, the high voltage at the contact rod,
   a ground clamp adapted to be plugged into said jack receptacle,
   a neon lamp disposed in said housing adjacent said window and having terminals connected across the fixed connection and the variable resistance connection of said variable resistor and designed to light up when the voltage indicated on the knob is near or at the voltage at the contact rod, and
   a capacitor connected across the lamp terminals and designed and mounted in a manner so as to cause said neon lamp to blink when said indicated voltage is reached.

2. A television high voltage testing probe, according to claim 1, having more than one capacitor of different capacitance values mounted in separate circuits across said lamp terminals, and
   a switch designed to throw in the capacitor of the desired capacitance for the voltage being tested, said switch being mounted in the wall of said housing.

3. A television high voltage testing probe, according to claim 1, having a second jack receptacle mounted in the wall of said housing, and having an internal jack connection,
   a line connecting said latter internal jack connection with said fixed connection of said variable resistor, whereby said cartridge is by-passed to enable reading of low voltages, and
   a low voltage calibration on said knob to enable reading of said low voltages in conjunction with said index.

4. A television high voltage testing probe, according to claim 1, in which said fixed resistance cartridge has a capacity of about 300 megohms to about 1500 megohms,
   said variable resistor has a capacity of about 5 megohms to about 10 megohms,
   said fuse resistor has a capacity of about one megohm, and
   a wall closing off the open end of said housing and having a central opening for accommodating said projecting shaft.

No references cited.

WALTER L. CARLSON, *Primary Examiner.*

E. L. STOLARUN, *Assistant Examiner.*